Sept. 21, 1943.    G. A. LYON    2,329,921
WHEEL STRUCTURE
Original Filed Jan. 21, 1941
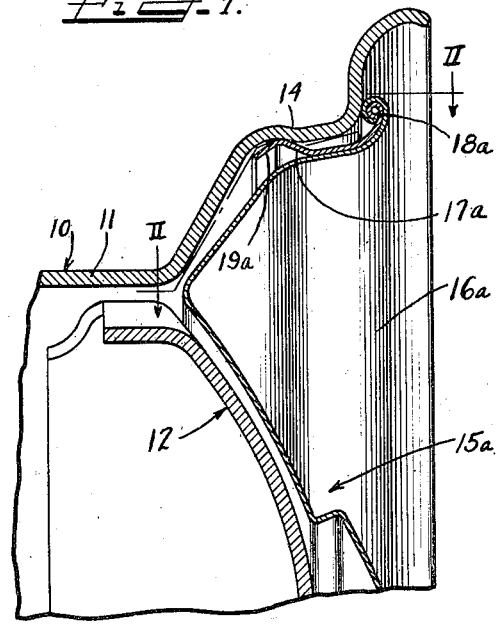
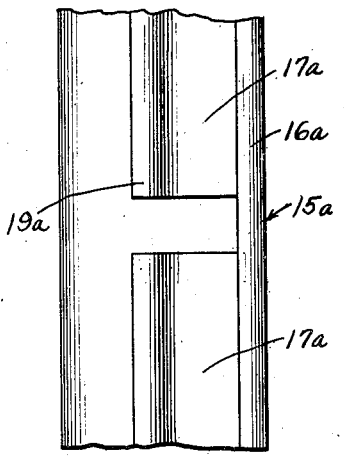
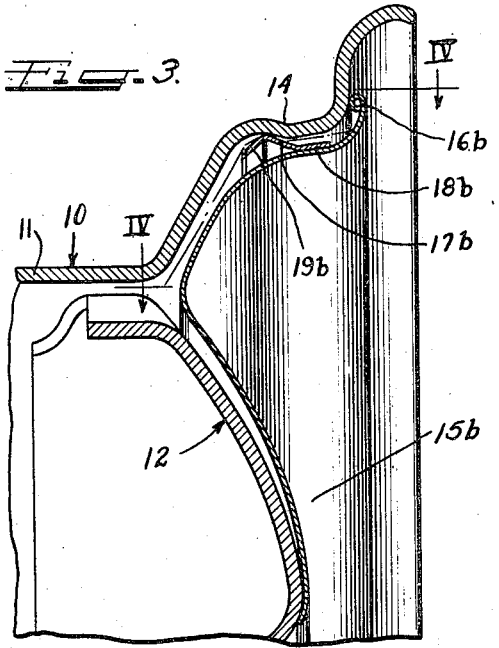
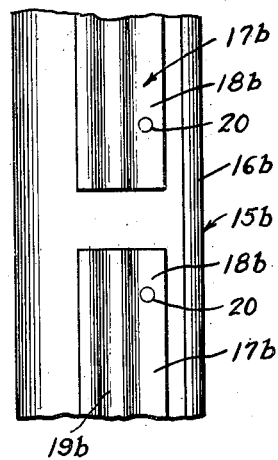
Inventor
GEORGE ALBERT LYON.

Patented Sept. 21, 1943

2,329,921

UNITED STATES PATENT OFFICE 2,329,921

WHEEL STRUCTURE

George Albert Lyon, Allenhurst, N. J.

Original application January 21, 1941, Serial No. 375,173. Divided and this application February 6, 1942, Serial No. 429,726

1 Claim. (Cl. 301—37)

The present invention relates to a wheel structure, and more particularly to a novel means for retaining a wheel cover member either in the form of a disk or an annulus on the wheel.

This subject matter has been divided from my copending application Serial No. 375,173, now Patent No. 2,304,584, filed January 21, 1941.

An object of this invention is to provide a wheel structure wherein a depressed tire bead retaining portion of the wheel rim part may be utilized in the retention of a cover member on the wheel.

Another object of this invention is to provide improved spring retaining means for detachably and resiliently holding a wheel cover on an automobile wheel.

Still another object of this invention is to provide a cover with resilient retaining means of such construction that it will readily cooperate with a depressed tire bead retaining portion formed in the tire rim of a wheel.

In accordance with the general features of this invention, there is provided in a wheel structure including a body part and a multi-flanged drop center rim part, which includes an outer axially extending flange having a hump, a circular cover member having a rolled outer edge and having fastened to its outer marginal portion resilient retaining means positioned with a free extremity to the rear of the rolled edge and having its extremity slightly raised for yieldable snap-on cooperation with the hump in the tire rim.

In accordance with other features of this invention, I provide a wheel cover having its outer edge rolled in such a manner that the resilient retaining split ring may be fixedly secured to the cover by means of the rolled or turned edge.

Other objects and features of this invention will more fully appear from the following detailed description taken in connection with the accompanying drawing which illustrates several embodiments thereof, and in which:

Figure 1 is a fragmentary cross sectional view through a circular automobile cover having a wheel cover held thereon by a split retaining ring;

Figure 2 is a fragmentary detailed view taken on the line II—II of Figure 1 looking downwardly at the retaining means;

Figure 3 is a fragmentary cross sectional view similar to Figure 1 but illustrating a modified form of retaining ring; and Figure 4 is a fragmentary detailed view taken on the line IV—IV of Figure 3 looking downwardly.

As shown on the drawing:

The reference character 10 designates generally a multi-flanged drop center type of tire rim which comprises one part of the conventional automobile wheel. This tire rim part includes a base flange 11 fastened by any suitable means to a central wheel body part or spider 12 which is of convex-concave cross section and includes the usual central bolt-on flange (not shown) by means of which the wheel may be suitably fastened to a support or shaft assembly. The tire rim part 10 has one of its axially extending outer flanges provided with a depression which extends radially inwardly and as a consequence provides an annular hump or protuberance 14.

Each rim part is provided with two of these annular depressions, one on each side of the base flange, and spaced apart so as to have seated in them the tire beads of the tire disposed in the tire rim part. The purpose of these depressions, as is now known in the art, is to prevent sidewise shifting of the tire beads upon sudden rupture or deflation of the automobile tire.

It is an object of this invention to utilize one of these depressed sections or humps 14, namely, the outermost one when the wheel is mounted, as a means for aiding in the retention of a wheel cover member, designated generally by the reference character 15a, on the wheel. The wheel cover member 15a may be made in the form of a solid disk or hub cap, as is shown in Figure 1, or may be in the form of an annulus, as shown in the modification illustrated in Figure 3.

The cover member, irrespective of which form of retaining means is used, there being two different forms illustrated in this application, is preferably stamped from relatively thin sheet metal such as stainless steel or the like and, of course, may be suitably ornamented as desired. Such a cover member may, for example, be made from sheet metal having a thickness of .020".

In the first form of cover member illustrated in section in Figure 1, as well as in the other form shown, the cover member has a cross sectional shape conforming generally to the outer cross sectional configuration of the rim and body parts of the wheel.

In both forms of my invention, the cover is easily applied to the wheel by merely pressing it axially into the position shown in Figures 1 and 3, at which time the retaining means, described hereinafter, are in cooperation with the rear side of the hump 14 of the tire rim part 10. To remove the cover all that is necessary to do is to insert a pry-off tool or screwdriver under the outer rolled edge and to then exert a fulcrumed pry-off pressure against the cover; the fulcrum for the pry-off tool being the rim part 10 itself.

The wheel cover 15a has a split transversely resilient retaining ring 17a held in place by the turned outer edge 16a of the cover. The ring 17a has a turned end 18a interlocked with the rolled outer edge 16a of the cover member. The ring 17a also has a humped or upwardly bent free yieldable extremity 19a adapted to be sprung or cammed over the hump or depressed section 14 in the rim part. It should be noted that the ring is backed up throughout a substantial portion of its width by the outer margin of the cover part against which the ring bears, as shown in Figure 1.

In the modification shown in Figures 3 and 4, the wheel cover member 15b is in the form of an annulus instead of a solid disk and has its outer marginal edged rolled or turned as indicated at 16b. Fastened to the outer marginal portion of the cover member 15b just inwardly of the turned edge 16b is a rearwardly extending split resilient ring 17b, which has a humped free extremity 19b adapted to bear against the rear side of the hump 14 in the tire rim part. This spring retaining means, as in the case of the other form of the invention, is at the outer margin of the cover member but differs from the previous form of retaining means in that it is secured to the cover member by being welded thereto as designated at 20 in Figure 4. Otherwise, this modified form of cover cooperates with the rim part in the same way as in the previously described form.

In both forms of the invention, the free bent end or extremity of the split ring is normally of a diameter slightly in excess of the inside diameter of the hump 14, so that this extremity must be deflected radially inwardly as it is passed over the hump 14. Even when the extremity of the ring is in retaining cooperation with the wheel behind the hum 14, it is still not in its normal position but is slightly deflected inwardly and as a consequence is under tension and applies a resilient cover retaining pressure to the rear side of the hump 14. Also, in both forms of the invention, the split characteristic of the ring 17a—17b permits of its inner or rear edge or marginal portion to expand and contract in the manner noted above in cooperation with the hump 14.

I claim as my invention:

As an article of manufacture, a circular wheel cover member having secured to its outer margin a one-piece continuous retaining ring with the exception of a single gap extending transversely rearwardly from the cover member and being arched adjacent its rear edge for resilient flexing into snap-on engagement with a wheel part, said ring being attached at one side to said cover member and having a rear free edge flexible in its entirety from one diameter to another as the wheel cover member is moved into and out of retaining cooperation with a wheel part.

GEORGE ALBERT LYON.